Figure 1:
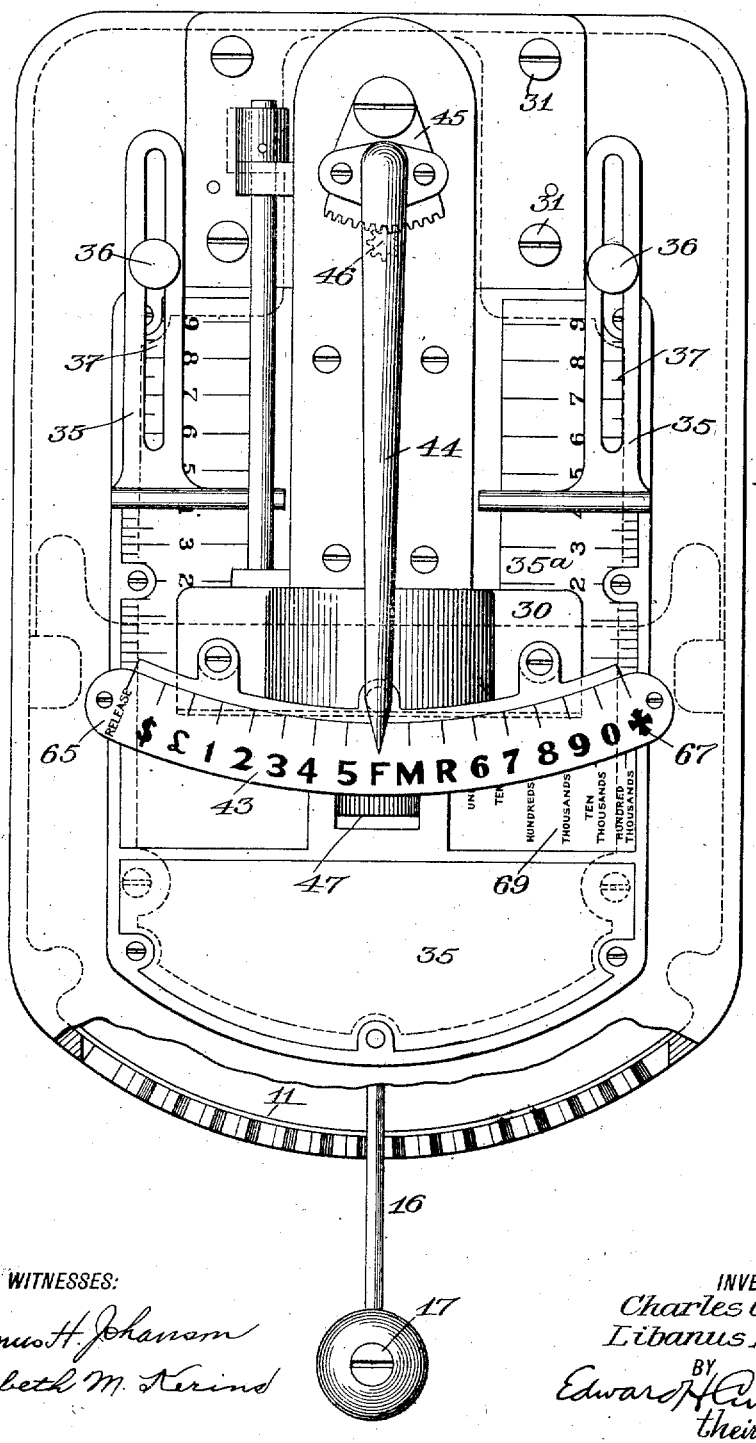

C. G. TIEFEL & L. M. TODD.

PRINTING APPARATUS.

APPLICATION FILED MAY 12, 1915.

Reissued Aug. 3, 1915.

13,958.

7 SHEETS—SHEET 1.

WITNESSES:

Magnus H. Johanson

Elizabeth M. Kerind

INVENTORS

Charles G. Tiefel

Libanus M. Todd

BY

Edward H. Rumpston Jr.

their ATTORNEY

C. G. TIEFEL & L. M. TODD.

PRINTING APPARATUS.

APPLICATION FILED MAY 12, 1915.

Reissued Aug. 3, 1915.

13,958.

7 SHEETS—SHEET 2.

WITNESSES:

Magnus H. Johnson

Elizabeth M. Kerind

INVENTORS

Charles G. Tiefel

Libanus M. Todd

BY

Edward H. Thompson Jr.

their ATTORNEY

C. G. TIEFEL & L. M. TODD.
PRINTING APPARATUS.
APPLICATION FILED MAY 12, 1915.
Reissued Aug. 3, 1915.
13,958.
7 SHEETS—SHEET 3.
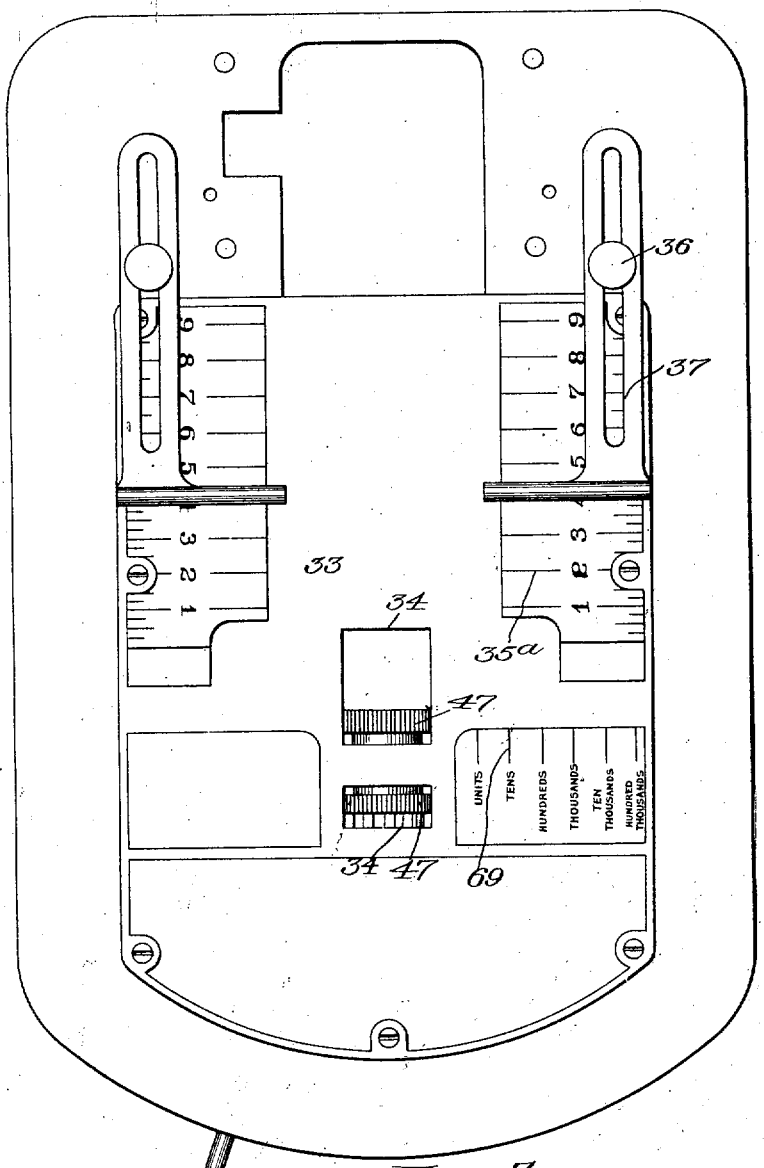
Fig. 3
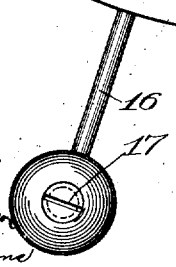
WITNESSES:
Magnus H. Johnson
Elizabeth M. Kerins
INVENTORS
Charles G. Tiefel
Libanus M. Todd
BY
Edward H. Crampton Jr.
their ATTORNEY

C. G. TIEFEL & L. M. TODD.

PRINTING APPARATUS.

APPLICATION FILED MAY 12, 1915.

Reissued Aug. 3, 1915. 13,958.

7 SHEETS—SHEET 4.

WITNESSES:

Magnus H. Johnson

Elizabeth M. Kerins

INVENTORS

Charles G. Tiefel

Libanus M. Todd

BY

Edward H. Crampton Jr.

their ATTORNEY.

C. G. TIEFEL & L. M. TODD.
PRINTING APPARATUS.
APPLICATION FILED MAY 12, 1915.

Reissued Aug. 3, 1915.

13,958.
7 SHEETS—SHEET 5.

WITNESSES:
Magnus H. Johnson
Elizabeth M. Kerins

INVENTORS
Charles G. Tiefel
Libanus M. Todd
BY
Edward H. Crampton Jr
their ATTORNEY C. G. TIEFEL & L. M. TODD.
PRINTING APPARATUS.
APPLICATION FILED MAY 12, 1915.
Reissued Aug. 3, 1915.
13,958.
7 SHEETS—SHEET 6.
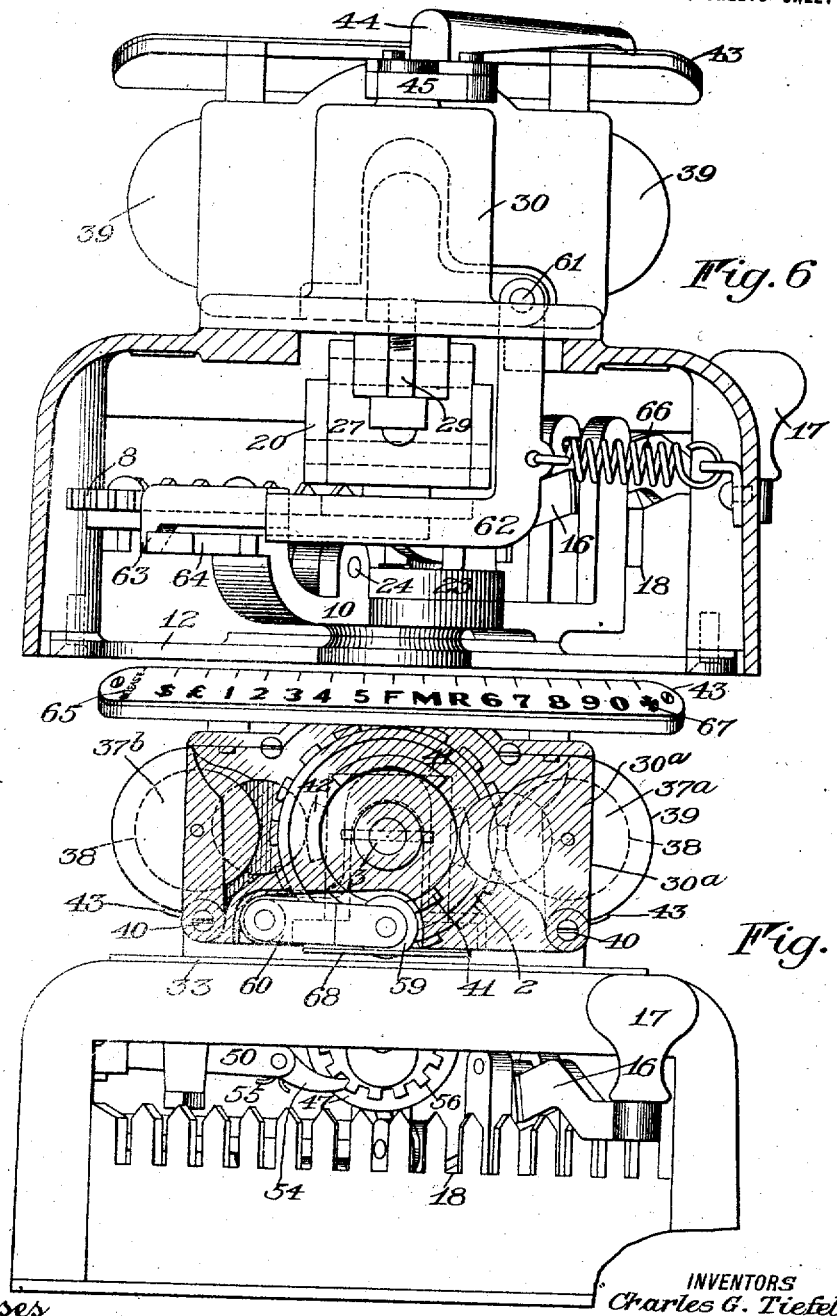
Witnesses
Magnus H. Johnson
Elizabeth M. Kerins
INVENTORS
Charles G. Tiefel
Libanus M. Todd
BY
Edward N. Cumpston Jr.
their ATTORNEY

C. G. TIEFEL & L. M. TODD.

PRINTING APPARATUS.

APPLICATION FILED MAY 12, 1915.

Reissued Aug. 3, 1915.

13,958.

7 SHEETS—SHEET 7.

WITNESSES:

Magnus H. Johnson

Elizabeth M. Kerins

INVENTORS

Charles G. Tiefel

Libanus M. Todd

BY

Edward H. Cumpston Jr.

Their ATTORNEY

UNITED STATES PATENT OFFICE.

CHARLES G. TIEFEL AND LIBANUS M. TODD, OF ROCHESTER, NEW YORK, ASSIGNORS TO G. W. TODD & COMPANY, OF ROCHESTER, NEW YORK, A FIRM COMPOSED OF GEORGE W. TODD AND LIBANUS M. TODD.

PRINTING APPARATUS.

13,958. Specification of Reissued Letters Patent. Reissued Aug. 3, 1915.

Original No. 1,061,508, dated May 13, 1913, Serial No. 412,224. Application for reissue filed May 12, 1915. Serial No. 27,659.

*To all whom it may concern:*

Be it known that we, CHARLES G. TIEFEL and LIBANUS M. TODD, of the city of Rochester, county of Monroe, and State of New York, have invented certain new and useful Improvements in Printing Apparatus; and we do hereby declare the following to be a full, clear, and exact description of the same, reference being had to the accompanying drawings, forming a part of this specification, and to the reference-numerals marked thereon.

The present invention relates to printing apparatus and it has for its object to provide an improved machine for printing limiting amount indicating characters on negotiable instruments, such as checks, drafts, or bonds to prevent the original amount written in the body of the instrument from being fraudulently increased, or raised.

Our invention has for its further object to provide means whereby the numerals or amount indicating characters and the symbols employed in connection therewith and located at the ends of the printed amount may be printed in inks of different colors, or of different composition, to perform the dual purpose of giving distinctness to the amount indicating characters themselves and also to effectively thwart prefixing or suffixing other amount indicating characters to those previously applied to the instrument.

To these and other ends the invention consists in certain improvements and combinations of parts all as will be hereinafter more fully described, the novel features being pointed out in the claims at the end of the specification.

Figure 2:
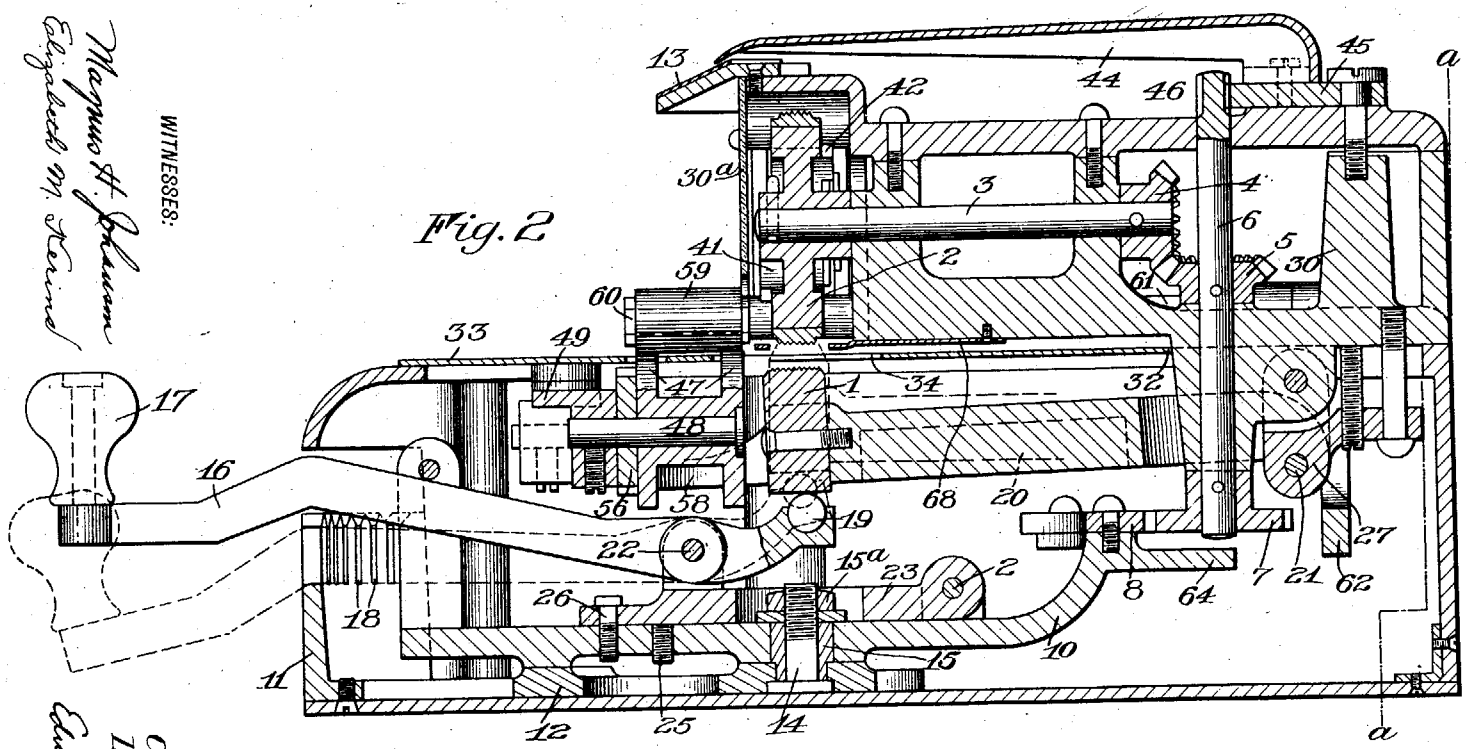
Figure 4:
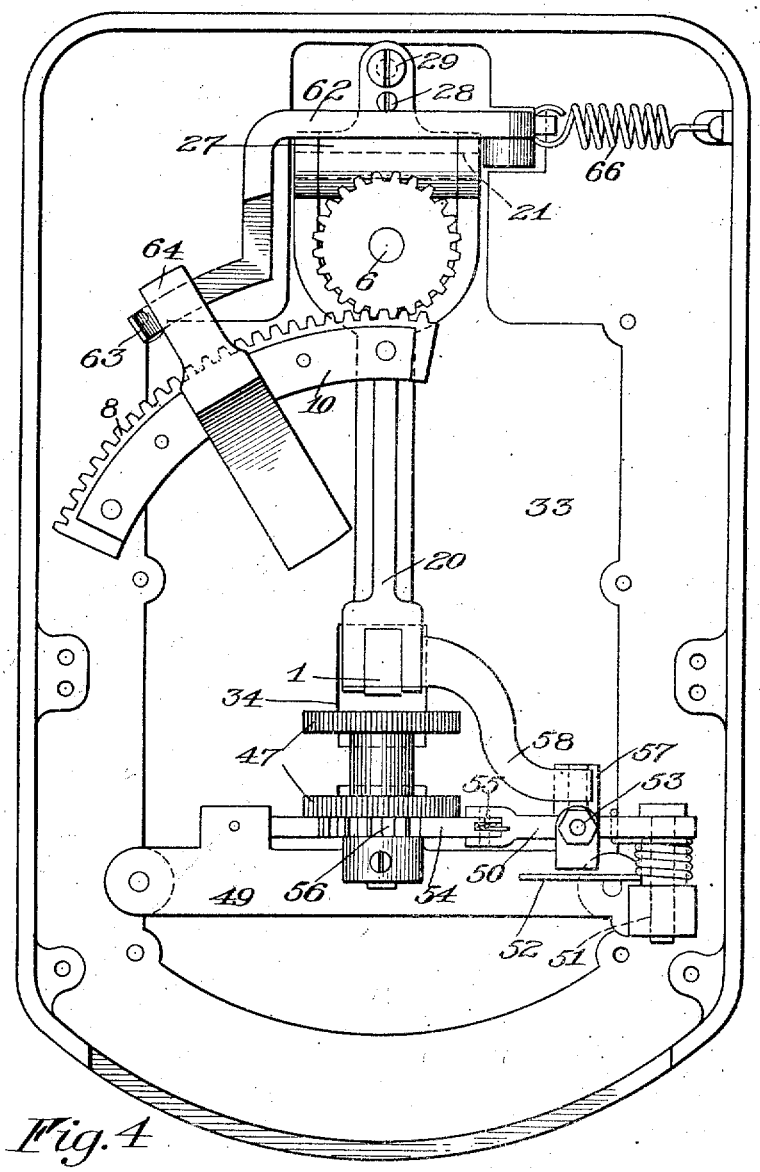
Figure 5:
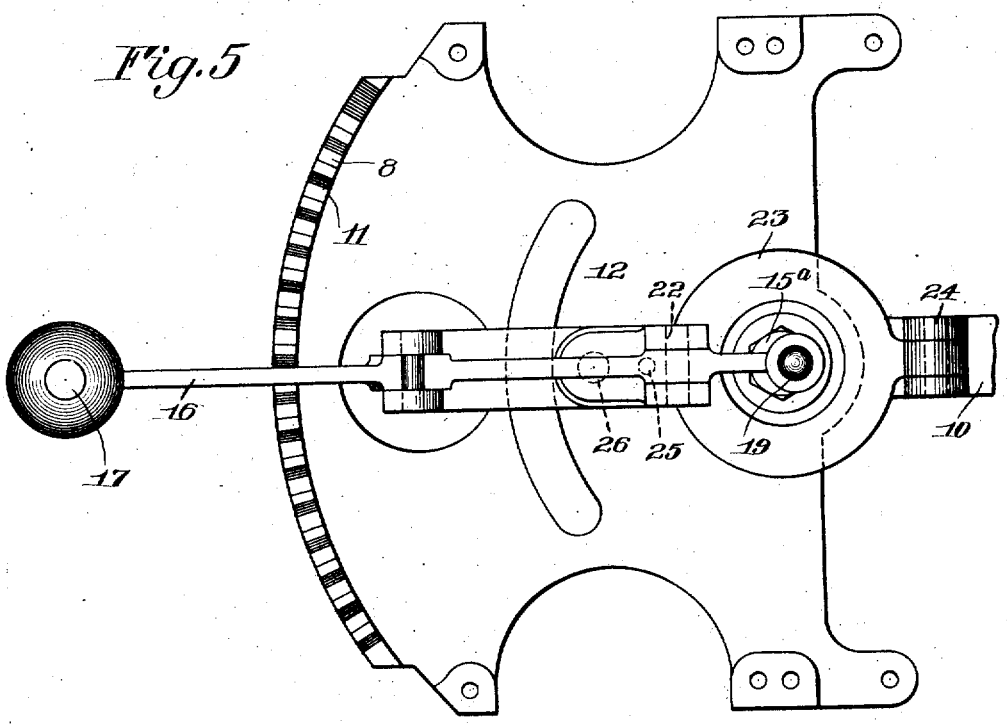
Figure 8:
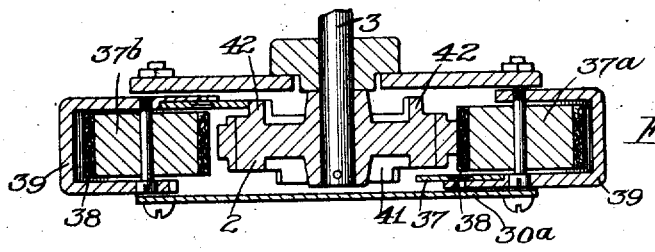
Figure 9:
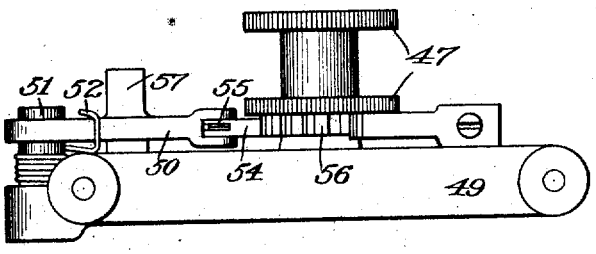
Figure 10:
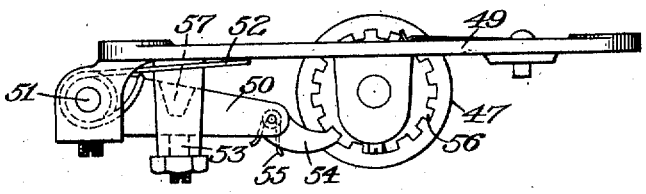
Figure 11:
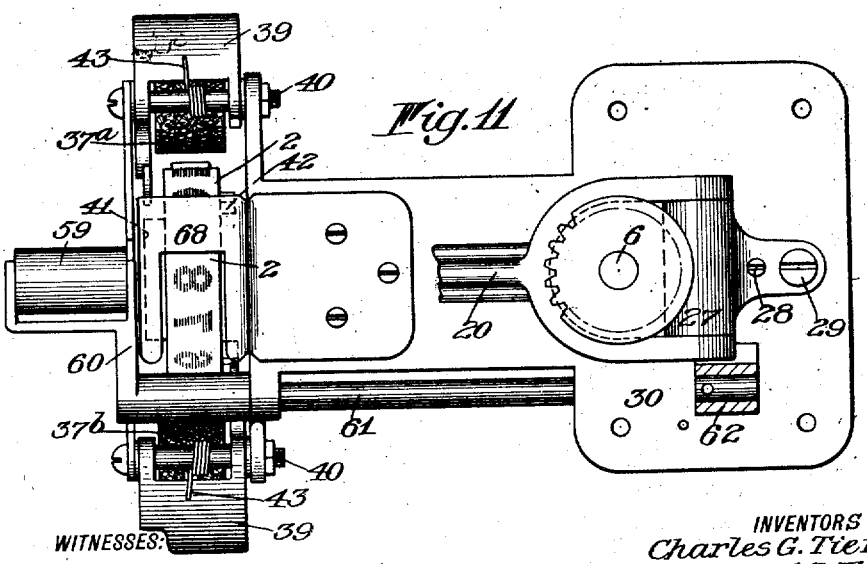

In the drawings: Figure 1 is a plan view of a machine constructed in accordance with this invention; Fig. 2 is a longitudinal sectional view; Fig. 3 is a plan view of the casing with the printing mechanism removed; Fig. 4 is a bottom view of the casing with the bottom and other parts removed; Fig. 5 is a top view of the frame which carries the operating handle for the printing mechanism; Fig. 6 is a sectional view on the line *a—a* of Fig. 2; Fig. 7 is a front view of the machine; Fig. 8 is a horizontal sectional view of the printing wheel and the inking mechanism; Fig. 9 is a top view of the work feeding mechanism detached; Fig. 10 is a side view of the work feeding mechanism detached, and, Fig. 11 is a bottom view of the overhanging frame.

While the invention is herein shown as embodied in a machine for printing amounts in checks, drafts and other similar written instruments, it is apparent that some of its features may be adapted for other printing apparatus. In the present embodiment a check, draft or the like is clamped upon a suitable work support, its position being determined by suitable gages and a scale. After each imprint of a character the work is automatically fed on the support and when the amount is filled in and the operating means is moved to a certain position, the work is automatically released. The characters denoting the currency of different countries and a character indicating the end of the printed amount in order to prevent the addition of other figures, are printed in an ink of a different color from that in which the amount indicating characters are printed, so that it is impossible to print over these characters without making the change apparent. The indicating means for the printing mechanism is so located that it is not covered by the work.

The present embodiment comprises a printing mechanism preferably consisting of a platen 1 and a type or printing wheel 2 operated by a suitable shifting means, the type wheel for this purpose being, if desirable, mounted on the forward end of a horizontally arranged shaft 3 provided at its rear end with a bevel gear 4 to mesh with a like gear 5 on a vertical shaft 6. Vertical shaft 6 may carry at its lower end a gear 7 with which may mesh an arcuate rack 8 on a horizontally swinging member or frame 10, whereby driving connection between the frame and printing wheel is established. In this embodiment the swinging member or frame is supported within a casing which incloses most of the parts of the appliance and comprises cast side walls, the front one of which has a horizontal slot, the portion 11 of this wall below the slot being detachable and integral with an inwardly extending frame 12 that supports the swinging member 10 and has secured thereto the removable bottom 13 of the casing. A headed bolt 14 is passed upwardly through frame 12 and through the bearing sleeve 15 of the swinging member, and nut 15[a] engages the bolt and the swinging member to hold the latter to the frame.

The swinging member 10 is controlled by an operating arm 16 which is pivoted thereon to turn about a horizontal axis and projects through the horizontal slot in the casing, its outer end being provided with a knob 17 by which it may be depressed into any one of a number of recesses or notches 18 formed in one wall of the horizontal slot.

The platen in the present instance is moved toward the type wheel and for this purpose the rear end of the arm 16 may carry an anti-friction ball 19 to coöperate with the platen and moves it around a pivot 21 with the arm 20, by which it is rigidly carried. The pivot points of the arm 16 and the arm 20 are shiftable, the former for the purpose of obtaining proper pressure on the platen, and the latter in order that the ridges formed on the impact face of the platen may be made to engage between the ridges forming the type on the printing wheel, so that the paper may be perforated. In this embodiment the pivot 22 of the arm 16 is carried by a frame or member 23 vertically adjustable by swinging about a horizontal pivot 24 on the horizontally swinging member 10 the member 23 being held in different positions by an adjustable stop 25 and an adjusting screw 26; while the pivot pin 21 is carried by a swinging frame or link 27, which is held in different positions by an adjustable stop 28 and an adjusting screw 29.

The frame or link 27 is preferably carried by the frame 30 which also carries the type or printing wheel 2, its horizontal shaft 3 and vertical shaft 6, the frame 30 being bolted at 31 to the casing near the rear of the latter, and having a depending portion that projects into the casing through an opening 32 and carries the vertical shaft 6 and the platen supporting link 27. This frame incloses the gears 4 and 5 and projects forwardly over the top 33 of the casing, while its forward end is recessed to house the printing wheel and the inking mechanisms to be described, a removable transparent plate 30[a] serving to close the recessed end and permit the inspection and cleaning of the parts therein.

The top 33 of the casing is removable and serves as a work support, being located a slight distance below the lowermost type on the printing wheel and provided with an opening 34 through which the hammer platen 1 is adapted to pass. Except when engaged by the platen the work is held away from the type wheel by a spring plate 68 recessed to receive the hammer and carried by the frame 30, while movable over the support to determine the position of the work are gages 35 which are adjustable forwardly and rearwardly over scales 35[a] by means of clamping screws 36 working in slots 37. A scale 69 extends in the direction of the feeding of the work on the support and serves to determine the position for the end of the check or the like in order that the operator may allow sufficient distance thereon in which to print the number of characters necessary to indicate a given amount. This scale is also arranged so that the last character of the amount will lie in proximity to the right hand margin of the check.

The impact face of the platen and the printing face of the type are made of metal and cut the fiber of the paper which is also supplied with indelible ink that is fed to the type by a suitable inking mechanism.

As in printing checks, drafts or the like, it is desirable that the symbols for the systems of currency of the different countries be printed in a different color from the amount, so that changes by superimposing are rendered practically impossible, two inking elements are preferably employed, one being thrown automatically to a position to coöperate with certain type, while the other is thrown automatically to a position to coöperate with other type. The inking mechanism comprises two inking elements preferably in the form of two wheels 37[a] and 37[b], each having an inking surface 38, which, when moved into engagement with the type wheel, rotates by contact therewith. Each wheel is mounted preferably on a single movable frame or housing 39, pivoted at 40 and normally tending to move toward the printing character under action of springs 43. They are moved from the printing wheel by a suitable device which preferably embodies two sets of cams or projections 41 and 42 arranged in diametrically disposed pairs on opposite sides of the type wheel to engage antifriction rollers or other parts on the swinging frame 39. The projections 41 are adapted to move the roller 37[a] out of coöperative relation with the type wheel when the type which print the amount coöperate with the roller 37[b], while the projections 42 move the roller 37[b] when the type which print the symbols coöperate with the roller 37[a].

In order to determine the type to be printed, there may be employed a suitable indicating means which is preferably located above the work support so that it will not be rendered obscure by the work. In the present instance an indicating plate 43 having the characters arranged thereon in the order of those on the type wheel, is positioned on the forward portion of the overhanging frame 30 above the work support, while a pointer or index 44 is bolted to a gear segment 45 pivoted on the rear portion of the frame 30, said gear segment being meshed with a pinion 46 on the upper portion of the vertical shaft 6, so that when the handle or arm 16 is swung the pointer will move in accordance therewith.

After each impression of the type the work is advanced by a suitable working feeding mechanism which preferably comprises a rotary element or wheel having two spaced roughened portions 47 projecting slightly above the top surface of the casing or work support. This rotary element turns on a pin 48 carried by a frame 49 that is bolted to the under surface of the top of the casing. This frame 49 may also carry a swinging lever 50 turning about a pivot 51 and normally held in the lower position by a spring 52, an adjustable stop 53 on the frame 49 acting to limit its movement under the action of the spring. Lever 50 has pivoted thereto a dog or pawl 54 which is pressed upwardly by a spring 55 and engages a ratchet wheel 56 turning with the rotary element on the downward movement of the lever 50, the upward movement of the lever 50 causing the dog to ride over the ratchet wheel. To effect the elevation of the lever the latter is provided with an offset arm 57 engaged by a lateral extension 58 on the arm 20 carrying the platen; and by this means when the platen drops or is moved away from the type wheel the work will be fed forward one space to receive another impression, and, on the elevation of the platen the dog 54 rides over the ratchet wheel.

Coöperating with the feeding device is a clamping device controlled by the shifting means. This device preferably embodies a roller 59 suitably journaled on the arm 60 extending from a rock shaft 61. Rock shaft 61 extends longitudinally of the frame and at its rear end carries a depending L-shaped arm 62, the free end of which is formed with a depending beveled portion 63 with which coöperates a rearward extension 64 on the horizontally swinging member or frame 10 in order to effect the elevation of the roller 59 and the release of the work when the arm 16 is moved to release position, this position being indicated on the dial at 65. A spring 66 connecting the casing and the arm serves to move the roller to clamping position.

Generally stated, the operation of the invention is as follows: While the arm 16 is in release position, a check, draft or the like is fitted beneath the type wheel, against the gages 35 and with a side edge alined with one of the divisions or scale 69 corresponding to the amount to be printed. The arm 16 is now swung until the index 44 points to the symbol to indicate the currency ($, £, M, F or R), and is then depressed to move the platen against the type wheel, causing the symbol to be printed in ink of one color. With the elevation of the arm the work is fed one step and then the amount is printed in another color, by successive swinging movements and depressions of the arm. After the amount has been completed, the symbol 67 which occurs last on the dial, is printed in the color of the symbol of the currency in order to prevent the addition of other characters to raise the amount of the paper, and then the arm is moved to release position to free the paper by moving the clamp.

An apparatus constructed in accordance with this invention will so mark commercial paper that fraudulent raising of the same will be prevented. It insures the proper positioning of the characters on the paper and facilitates the work of making checks, drafts or the like by having all of the movements of the apparatus controlled by a single lever.

We claim as our invention:

1. In a printing apparatus, the combination with a main frame, a printing wheel journaled thereon and means for rotating it, of a platen coöperating with the wheel, a pivoted arm by which the platen is carried, a link carrying the pivot of the arm and connecting it with the main frame, devices for adjusting the link to shift the pivot of said arm and means for moving the platen toward the printing wheel.

2. In a printing apparatus, the combination with a printing wheel and a platen cooperating therewith, a horizontally swinging frame, a vertically swinging frame mounted on the horizontally swinging frame, an operating arm for the platen pivoted thereto, and devices for changing the position of the vertically swinging frame so as to alter the point of initial contact between the operating arm and platen.

3. In a printing apparatus, the combination with a printing wheel, of a platen cooperating with the printing wheel and movable about an axis in a plane at one side of said wheel, the pivotal axis of the platen being movable toward and from the plane of the printing wheel so as to shift said arm lengthwise and alter the contacting relation between the printing wheel and platen, and an operating arm for adjusting the printing wheel and swinging the platen.

4. In a printing apparatus, the combination with a main frame, a printing wheel, of a pivoted arm, a platen carried by the pivoted arm, a separate frame piece supporting the pivot of the arm, adjustable on the main frame to shift the arm and alter the contacting relation between the printing wheel and platen, and devices for moving the arm on its pivot to carry the platen into engagement with the printing wheel.

5. In a printing apparatus, the combination with a printing mechanism, of selective means for operating the printing mechanism, a feeding device adapted to advance the work piece step-by-step relatively to the printing mechanism, a clamp movable on the feeding device to coöperate therewith during the feeding, and devices controlled by the selective means for effecting movement of said clamp.

6. In a printing apparatus, the combination with a selective mechanism and a lever for operating it, of a feeding device adapted to advance a work piece step by step relatively to said mechanism, a clamp coöperating with said feeding device during the feeding, movable toward and from the latter, and means governed by the operating lever for controlling the movement of the clamp.

7. In a printing apparatus, the combination with a printing mechanism, of selective means for operating the printing mechanism, a rotary step-by-step feeding device, a rotary clamp, one of which is movable toward and from the other, and a mechanism controlled by the selective means for effecting the relative movement between the rotary feeding device and the rotary clamp.

8. In a printing apparatus, the combination with a printing mechanism, of selective means for operating the printing mechanism, a feed roller adapted to advance the work, step-by-step relatively to the printing mechanism, a clamping roller movable toward and from the feeding roller to coöperate therewith during the feeding, and devices controlled by the selective means for effecting movement of the clamp roller toward and from the feeding roller.

9. In a printing apparatus, the combination with a work support, and a clamp movable toward and from the work support for holding a work piece in operative position thereon, of a selective printing mechanism, a lever for operating it, and a device for moving the clamp toward the work support controlled by the operating lever on the printing movement of the latter.

10. In a printing apparatus, the combination with a work support and a clamp movable toward and from the work support for holding a work piece in operative position thereon, of a rotary printing wheel, a lever for shifting the wheel to select a type thereon, and means coöperating with the lever for operating the work clamp toward the work support on the printing movement of the lever.

11. In a printing apparatus, the combination with a rotatable printing wheel and a frame operatively connected thereto for effecting the rotation of the printing wheel, of a clamp for holding a work piece in operative position relatively to the wheel, and means operated when the frame is moved into a predetermined position for opening the clamp.

12. In a printing apparatus, the combination with a work support, and a clamp for holding a work piece in operative position thereon embodying a rock shaft having an arm carrying a roller, of a printing wheel, a movable member, means for shifting it which controls the movement of the rock shaft to move the roller relatively toward and from the work support.

13. In a printing apparatus, the combination with a work support, and a clamp for holding the work in operative position thereon embodying a rock shaft having an arm carrying a roller, of a printing wheel, and a swinging frame geared to the wheel and an operating part on the shaft coöperating with the frame to move the roller toward and from the work support.

14. In a printing apparatus, the combination with a printing wheel, a platen coöperating therewith and a swinging frame for shifting the printing wheel, an operating lever on the swinging frame coöperating with the platen and a work clamp movable toward and from the platen and having its movements controlled by the operating lever.

15. In a printing apparatus, the combination with a movable printing wheel, a movable frame coöperating therewith for operating the printing wheel and a clamp for holding a work piece in operative position relatively to the wheel comprising a rock shaft and a roller supported thereon, of a depending arm on the rock shaft operated when the frame is moved into a predetermined position to rotate the shaft.

16. In a printing apparatus, the combination with a printing wheel and a clamp for holding a work piece in operative position relatively to said wheel and a platen coöperating with the latter, of a mechanism for shifting the printing wheel and operating the platen, and operating connections between said mechanism and clamp for moving the latter to disengage the work piece when said operating device is moved into a predetermined position.

17. In a printing apparatus, the combination with a work support, and a work piece clamp, of a printing wheel, an operating device for shifting the printing wheel, and operating connections between said device and clamp for causing the latter to disengage a work piece placed on the support when the operating device is moved to a predetermined position.

18. In a printing apparatus, the combination with a housing open at its ends, a printing wheel mounted within the housing, and means for shifting it, of swinging frames closing the open ends of the housing, inking elements mounted on and inclosed by the swinging frames, springs tending to move the frames so that the inking elements coöperate with the printing wheel, and devices controlling the movement of the frames for causing their respective inking elements to alternately engage the wheel.

19. In a printing apparatus, the combination with a casing having a work support thereon, of a forwardly projecting frame overhanging the work support, a wheel provided with printing characters and carried by the overhanging frame, an index plate also carried by the forward portion of said frame, and provided with indicia corresponding to the type characters, a forwardly projecting pointer movable on top of the overhanging frame and over the plate, and an operating device for moving the printing wheel and the pointer.

20. In a printing apparatus, the combination with a printing wheel and a platen, movable relatively toward and from each other, of a casing inclosing said parts, having a work support, a frame detachably supported in the casing, a feed wheel journaled on the frame, a lever pivoted to the frame and moved in one direction by the relative movement of the platen and printing wheel toward each other, a spring for moving the lever in the other direction, an adjustable stop for the lever, a pawl carried by the latter, a ratchet wheel connected to the feed wheel and operated by the pawl upon a relative movement of the platen and printing wheel away from each other.

21. In a printing apparatus for applying limiting amount characters to a negotiable instrument, the combination with a wheel having a common printing point and provided with numeral characters for printing the amount arranged in two groups, other symbols, designating the kind of currency, which are arranged in groups alternating with the groups of numerals and two separate inking elements, one adapted to cooperate with the groups of numerals and the other to engage the groups of symbols, of means for imparting rotary movement to the wheel and moving the inking elements relatively to the wheel and into engagement with their respective groups of characters and means for feeding the work relatively to the wheel.

22. In a printing apparatus, the combination with a printing wheel, a platen coöperating therewith, a swinging frame, a member thereon for operating the frame and platen and operating connections between the frame and wheel for oscillating the latter, devices for feeding a work piece relatively to the wheel comprising a movable clamping member, devices controlled by the movement of the frame for adjusting the latter into operative and inoperative positions, and a plurality of inking devices cooperating with the wheel and means for moving them into and out of engagement therewith during the rotary movement of the wheel.

23. In a printing apparatus, the combination with a casing having its top forming a work support, of a frame overhanging the work support and depending into the casing, a printing wheel arranged at the forward end of the overhanging frame, a horizontally arranged shaft carrying the printing wheel and journaled on the frame, a vertically arranged shaft carried by and journaled on the frame and geared to the horizontal shaft, a swinging frame pivoted to the depending portion of the overhanging frame, an arm pivoted to the swinging frame, a platen carried by the arm, a horizontally swinging frame arranged in the casing and geared to the vertical shaft, and an operating arm pivoted to the horizontally swinging frame and adapted to operate the platen.

24. In a printing apparatus, the combination with a casing having a work support thereon, of a forwardly projecting frame overhanging the work support, a printing wheel carried by the frame and provided with characters for printing an amount in one color, with symbols to be printed at the ends of the amount in a different color, and also with separate inking elements supplied with inks of different colors, one adapted to coöperate with said amount characters and another to coöperate with said end symbols, said wheel being freely shiftable in either direction to bring said characters and symbols selectively to a common printing point, a platen, said wheel and platen being movable relatively toward and from each other to impress the work and means for feeding the work relatively to the printing wheel.

25. In a printing apparatus, the combination with a wheel having a common printing point and provided with characters for printing an amount in one color, with other symbols for designating the kind of currency in a different color, and with separate inking elements supplied with inks of different colors, one adapted to coöperate with the amount characters and another to cooperate with the currency symbols, said wheel being freely shiftable in either direction to bring said characters and symbols selectively, to the common printing point, a dial and pointer for indicating the position of the wheel, and a platen for coöperation with said wheel to impress the work.

CHARLES G. TIEFEL.
LIBANUS M. TODD.

Witnesses:
MAGNUS H. JOHANSON,
EDW. H. CUMPSTON, Jr.